(12) United States Patent
Fuller

(10) Patent No.: US 8,641,576 B2
(45) Date of Patent: Feb. 4, 2014

(54) HYDRAULIC VARIATOR CONTROL ARRANGEMENT

(75) Inventor: John Fuller, Preston (GB)

(73) Assignee: Torotrak (Development) Limited, Leyland, Lancashire (GB)

( * ) Notice: Subject to any disclaimer, the term of this patent is extended or adjusted under 35 U.S.C. 154(b) by 1463 days.

(21) Appl. No.: 10/566,114

(22) PCT Filed: Jun. 15, 2004

(86) PCT No.: PCT/GB2004/002500
§ 371 (c)(1),
(2), (4) Date: May 16, 2007

(87) PCT Pub. No.: WO2005/015061
PCT Pub. Date: Feb. 17, 2005

(65) Prior Publication Data
US 2011/0105272 A1    May 5, 2011

(30) Foreign Application Priority Data
Jul. 25, 2003    (GB) ...................................... 0317499

(51) Int. Cl.
*F16H 15/38*    (2006.01)
(52) U.S. Cl.
USPC ............................................. 476/10; 476/40
(58) Field of Classification Search
USPC .............................. 476/10, 40, 42, 46; 467/41
See application file for complete search history.

(56) References Cited

U.S. PATENT DOCUMENTS

| | | | |
|---|---|---|---|
| 3,142,190 A | 7/1964 | Kelsey et al. | |
| 5,938,557 A * | 8/1999 | Greenwood | 475/216 |
| 6,030,310 A | 2/2000 | Greenwood et al. | |
| 6,162,144 A | 12/2000 | Haka | |
| 7,318,786 B2 * | 1/2008 | Greenwood et al. | 476/10 |

FOREIGN PATENT DOCUMENTS

| | | |
|---|---|---|
| EP | 0006690 A1 | 1/1980 |
| EP | 894210 A1 | 2/1999 |
| EP | 1273833 A1 | 1/2003 |
| GB | 1132473 A | 11/1968 |
| GB | 2100372 A | 12/1982 |

(Continued)

OTHER PUBLICATIONS

Great Britain Search Report for Application No. GB 0317499.2, dated Jan. 20, 2004, 1 page.

(Continued)

*Primary Examiner* — William C Joyce
(74) *Attorney, Agent, or Firm* — Blakely, Sokoloff, Taylor & Zafman LLP

(57) ABSTRACT

In a continuously-variable-ratio-device of the type having races between which drive is transferred by rollers which are movable in accordance with changes of variator ratio, it is necessary to apply a traction load urging the rollers and races into engagement. Each rollers is also subject to a transverse reaction force by a hydraulic reaction roller actuator receiving a controlled reaction pressure. It is desirable to create a relationship between traction and reaction force, and also to provide for adjustment of this relationship. In the present invention this is achieved hydraulically. A traction pressure related to the reaction pressure is applied to an actuator which creates the traction load. The hydraulics also include a working chamber, which is selectively connectable to and disconnectable from either (or both) of (i) the reaction pressure and (ii) the traction pressure, the traction force being dependent upon pressure in the working chamber.

12 Claims, 4 Drawing Sheets

(56) References Cited

FOREIGN PATENT DOCUMENTS

| JP | 1-250657 | * | 10/1989 |
|----|----------|---|---------|
| JP | 05-039348 | | 2/1993 |
| JP | 10-089448 | | 4/1998 |
| JP | 2000-508745 A | | 7/2000 |
| JP | 2000-257685 A | | 9/2000 |
| WO | WO 02/079675 A1 | | 10/2002 |

OTHER PUBLICATIONS

PCT International Search Report and Written Opinion for PCT/GB2004/002500, dated Nov. 1, 2004, 14 pages.
PCT Invitation to Pay Additional Fees for PCT Application No. PCT/GB2004/002500, 7 pgs. (Aug. 27, 2004).
PCT Notification of Transmittal of International Preliminary Examination Report for PCT Application No. PCT/GB2004/002500, 7 pgs. (Jan. 30, 2006).
Office Action for Korean Patent Application No. 10-2006-7001661, 3 pgs., (Mar. 25, 2011).
Notice of Allowance for Korean Patent Application No. 10-2006-7001661, 3 pgs., (Feb. 28, 2012).
Office Action for Indian Patent Application No. 721/DELNP/2006, 2 pgs., (Nov. 18, 2008).
Hearing Notice for Indian Patent Application No. 721/DELNP/2006, 1 page, (Mar. 17, 2011).
Grant of Patent, for Indian Patent Application No. 721/DELNP/2006, 2 pgs., (Jun. 8, 2011).
First Office Action for Chinese Patent Application No. 200480021483.8, 3 pgs., (Jun. 20, 2008).
Second Office Action for Chinese Patent Application No. 200480021483.8, 5 pgs., (Feb. 5, 2010).
Notification of Grant of Patent Right for Chinese Patent Application No. 200480021483.8, 2 pgs., (Aug. 26, 2010).
Letters Patent for Chinese Patent Application No. 200480021483.8, 4 pgs., (Jan. 12, 2011).
Notice of Reasons for Refusal for Japanese Patent Application No. 2006-520872.3 pgs., (Mar. 5, 2010).
Notice of Allowance for Japanese Patent Application No. 2008-503973, 3 pgs., (Mar. 25, 2011).

* cited by examiner

HYDRAULIC VARIATOR CONTROL ARRANGEMENT

CROSS-REFERENCE TO OTHER APPLICATIONS

This is a National Phase of International Application No. PCT/GB2004/002500, filed on Jun. 15, 2004, which claims priority from Great Britain Patent Application No. 0317499.2, filed on Jul. 25, 2003.

FIELD

The present invention relates to control of traction load in a continuously variable transmission device ("variator") of rolling traction type.

BACKGROUND

In a rolling traction variator, drive is transmitted through at least one roller (and more typically a set of rollers) running upon at least one a pair of rotary races. To provide traction between rollers and races they must be biased into engagement with each other. The biasing force is referred to herein as the "traction load". In known variators the rollers and races do not make contact with each other since they are separated by a thin film of "traction fluid". It is shear of this fluid which, given suitably high pressure, provides the requisite roller/race traction.

Control of traction load is important to variator performance. One reason for this is that energy losses taking place at the roller/race interface vary with traction load, which thus has a bearing on variator efficiency. These losses are due to (1) spin at the interface—i.e. rotation of one surface relative to the other, due to the fact that the two surfaces are following circular paths about different axes and (2) shear at the interface—i.e. speed difference between the two surfaces, producing the shear in the fluid. It is found that excessively high traction loads increase spin, losses while low traction loads lead to high shear losses, optimal efficiency lying between the two extremes.

Another reason why traction load control is important is that excessive slip of rollers relative to the races, in response to inadequate traction loading, can result in failure of the variator and damage to it.

It is known to vary traction load in sympathy with "reaction force". To explain first of all what reaction force is, consider that due to the torque being transmitted the races exert a tangential force upon each of the rollers. This force must be reacted back to the transmission casing. In known rolling traction variators the rollers are typically movably mounted and the force exerted by the races is opposed by, and reacted to the casing through, an actuator acting upon the roller's mountings. The reaction force applied by the actuator is adjustable for the purpose of controlling the variator and is equal but opposite to the tangential force exerted by the races.

The variator's traction coefficient $\mu$ can be defined as follows $$\mu = \frac{RF}{TL}$$

where TL is the traction load and RF is the reaction force. This is strictly a simplification, since the true coefficient of traction at any chosen roller/race interface depends upon the magnitude of the forces perpendicular and parallel to the interface, and the traction load is not generally perpendicular to the interface. However this simple definition will suffice for the present discussion.

Variators are known in which traction load is varied along with reaction force to provide a constant traction coefficient. Reference is directed in this regard to Torotrak's European patent EP 894210 wherein reaction force is provided by double acting hydraulic roller actuators and the two pressures at these actuators are also led to a hydraulic traction load actuator. The hydraulic coupling of roller and traction load actuators is advantageous because it allows the traction load to be very quickly varied along with reaction force. This is important in responding to "torque spikes"—rapid fluctuations in transmission torque occurring for example upon emergency braking of the vehicle. A torque spike produces a rapid change in reaction force which could lead to slip between rollers and races, were if not for the fact that, in the known arrangement, increased pressures which are created in the roller actuators are passed on to the traction load actuator to correspondingly increase traction load with little time lag.

To increase still further the speed of response of the traction load to the reaction force, Torotrak's International Patent Application PCT/GB02/01551, published under No. WO 02/079675, teaches how pressure from the roller actuators can be used to control a pilot operated valve which in its turn controls application of fluid from a high pressure source to the traction load actuator. The same document recognises the desirability of adjusting the traction coefficient and provides some ways in which this can be achieved.

One reason for adjusting the traction coefficient (as opposed to maintaining, so far as possible, a constant ratio of traction load to reaction force) is that the properties of the traction fluid, and consequently the appropriate traction coefficient, vary with temperature. It is also desirable to adjust $\mu$ with variator rolling speed and with variator ratio.

WO 02/079675 suggests that traction coefficient adjustment can be carried out by applying an adjustable force to the spool of the pilot operated valve using a solenoid. The effect is to add an offset to the traction load so that $$TL = \frac{RF}{\mu} - OF$$

where $\mu$ is the traction coefficient which would be obtained without the solenoid force and OF is the offset produced by the solenoid force. It will be apparent that the ratio of traction load to reaction force varies as the magnitude of the reaction force varies and this is undesirable, particularly because an offset which produces an appropriate traction coefficient at high reaction force/traction load produces, at much lower levels of reaction force, a large error in traction load. Inaccuracy in this large offset could, furthermore, potentially result in the traction load being too small when the reaction force is low.

Rather than adding an offset to the traction load, it would be desirable to provide for adjustment of the traction coefficient itself, so that:—

$$TL = \frac{RF}{(\mu + K)}$$

where $\mu$ is once more the traction coefficient which would be provided in the absence of the adjustment and K is an adjustment determined by the control electronics associated with the variator. Given this relationship, changes in reaction force RF do not produce discrepancies in traction load. The desirability of this type of traction load control was recognised in WO 02/079675 but devising a practical hydraulic arrangement for achieving the relationship is problematic. That document did show one possible circuit which used a series pair of flow restrictors, one of which was variable, in a manner analogous to a potential divider in an electrical circuit, to modify the traction load pressure. This arrangement introduces certain problems of its own, particularly as it relies on a continuous flow of pressurized fluid out of the hydraulics, adding to the burden placed upon the associated pump or pumps.

The desirability of adjusting traction coefficient has also been recognised in U.S. Pat. No. 6,162,144, assigned to General Motors Corporation. However the circuit drawn in that patent simply uses a pulse width modulated valve to feed a percentage of the end load pressure to a second chamber of the traction load actuator, working in opposition to the main traction load pressure, to thereby adjustably modify the reaction load. It is believed that this would not provide a practical system capable of reacting with sufficient speed to rapid reaction force changes, the bandwidth of the pulse width modulated valve being too low.

SUMMARY

An aim of the present invention is to provide an improved means of controlling traction load, making provision for adjustment of the relationship between reaction force and traction load.

In accordance with the present invention, there is a hydraulic control arrangement for a variator of the type having a pair of races, at least one roller which is arranged to engage both races to transfer drive from one race to the other and is movable in accordance with changes in variator drive ratio, a hydraulic traction loading actuator arranged to apply a traction load urging the roller and races into engagement to provide traction therebetween and so enable the transfer of drive, and at least one hydraulic roller actuator arranged to apply a reaction force to the roller, the control arrangement comprising hydraulics for applying fluid at an adjustable reaction pressure to the roller actuator to control the reaction force and for applying fluid to the traction loading actuator at a traction pressure which is related to the reaction pressure, thereby maintaining a relationship between reaction force and traction load, characterised in that the control arrangement further comprises at least one working chamber which is selectively connectable to and disconnectable from the reaction pressure or the traction pressure, and in that traction force is dependent upon pressure in the working chamber, so that by connecting/disconnecting the working chamber to/from the relevant pressure, the relationship between reaction force and traction force is changed.

BRIEF DESCRIPTION OF THE DRAWINGS

Specific embodiments of the present invention will now be described, by way of example only, with reference to the accompanying drawings in which:—

DETAILED DESCRIPTION

Figure 1:
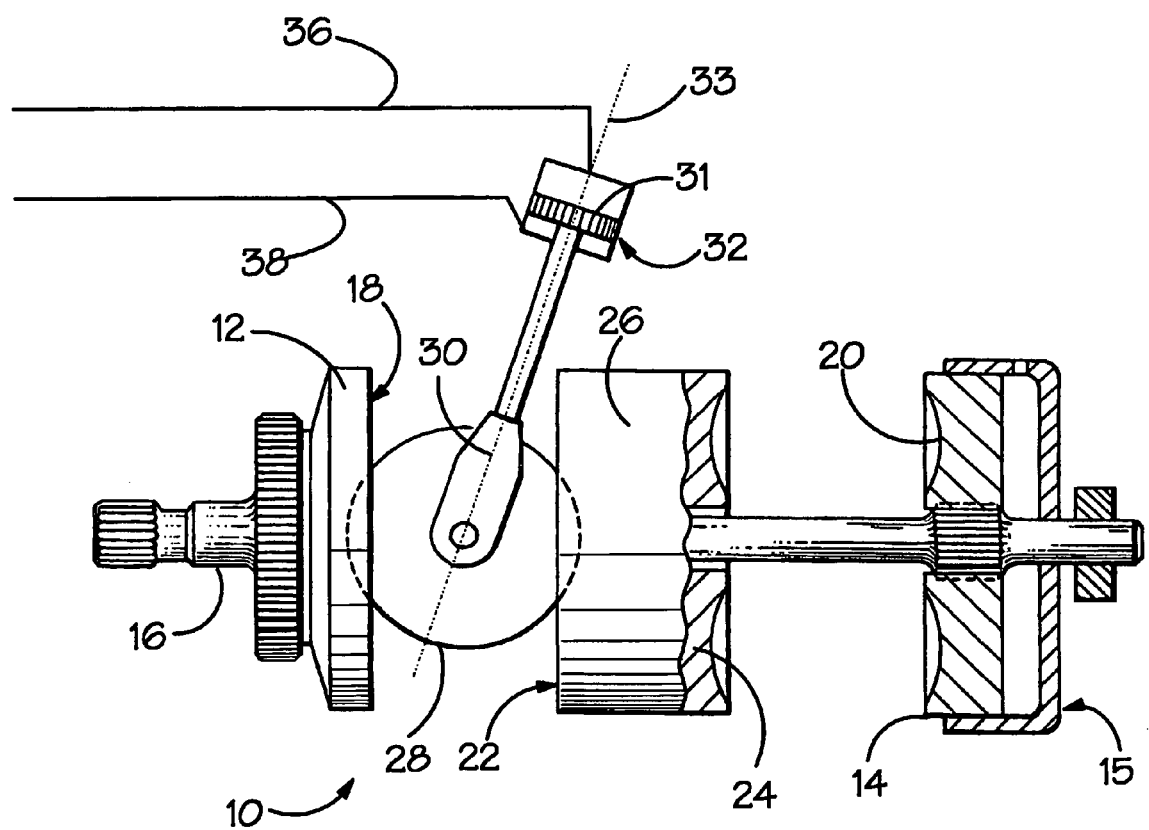
FIG. 1 is a simplified illustration of a toroidal race, rolling traction variator of a type which is in itself known and which is operable in accordance with the present invention.

Variators operable in accordance with the present invention are known in the art and an example will be only briefly described herein with reference to FIG. 1.

Two outer races, formed as shaped discs 12, 14 are mounted upon a drive shaft 16 for rotation therewith and have respective part-toroidal surfaces 18, 20 facing toward corresponding part toroidal surfaces 22, 24 formed upon an inner disc 26, two toroidal cavities being thus defined between the discs. The inner disc is journalled such as to be rotatable independently of the shaft 16. Drive from an engine or other prime mover, input via the shaft 16 and outer discs 12, 14 is transferred to the inner disc 26 via a set of rollers disposed in the toroidal cavities. A single representative roller 28 is illustrated but typically three such rollers are provided in each cavity. A traction load applied across the outer discs 12, 14 by a hydraulic traction load actuator 15 provides pressure between rollers and discs to enable such transfer of drive. Drive is taken from the inner disc to further parts of the transmission, typically an epicyclic mixer, as is well known in the art. Each roller is journalled in a respective carriage 30 which is itself coupled to a hydraulic actuator 32 whereby an adjustable reaction force can be applied to the roller/carriage combination. As well as being capable of translational motion the roller/carriage combination is able to rotate about an axis 33 determined by the hydraulic actuator 32 to change the "tilt angle" of the roller and to move the contacts between rollers and discs, thereby allowing variation in the variator transmission ratio, as is well known to those skilled in the art.

The illustrated variator is of the type known in the art as "torque controlled". The hydraulic actuator 32 exerts a controlled reaction force on the roller/carriage and this is balanced by an equal but opposite force upon the roller resulting from the torques transmitted between the disc surfaces 18, 20, 22, 24 and the roller 28. The reaction force upon the carriage 30 is adjusted by means of a hydraulic circuit through which fluid is supplied to opposite sides of piston 31 of the hydraulic actuator 32 at different, adjustable pressure through hydraulic feed lines 36 and 38. The principal control input to the variator is thus provided in the form of two hydraulic pressures, applied to the roller control pistons through the hydraulic feed lines 36 and 38. These pressures are manipulated through the hydraulic control circuit.

Figure 2:
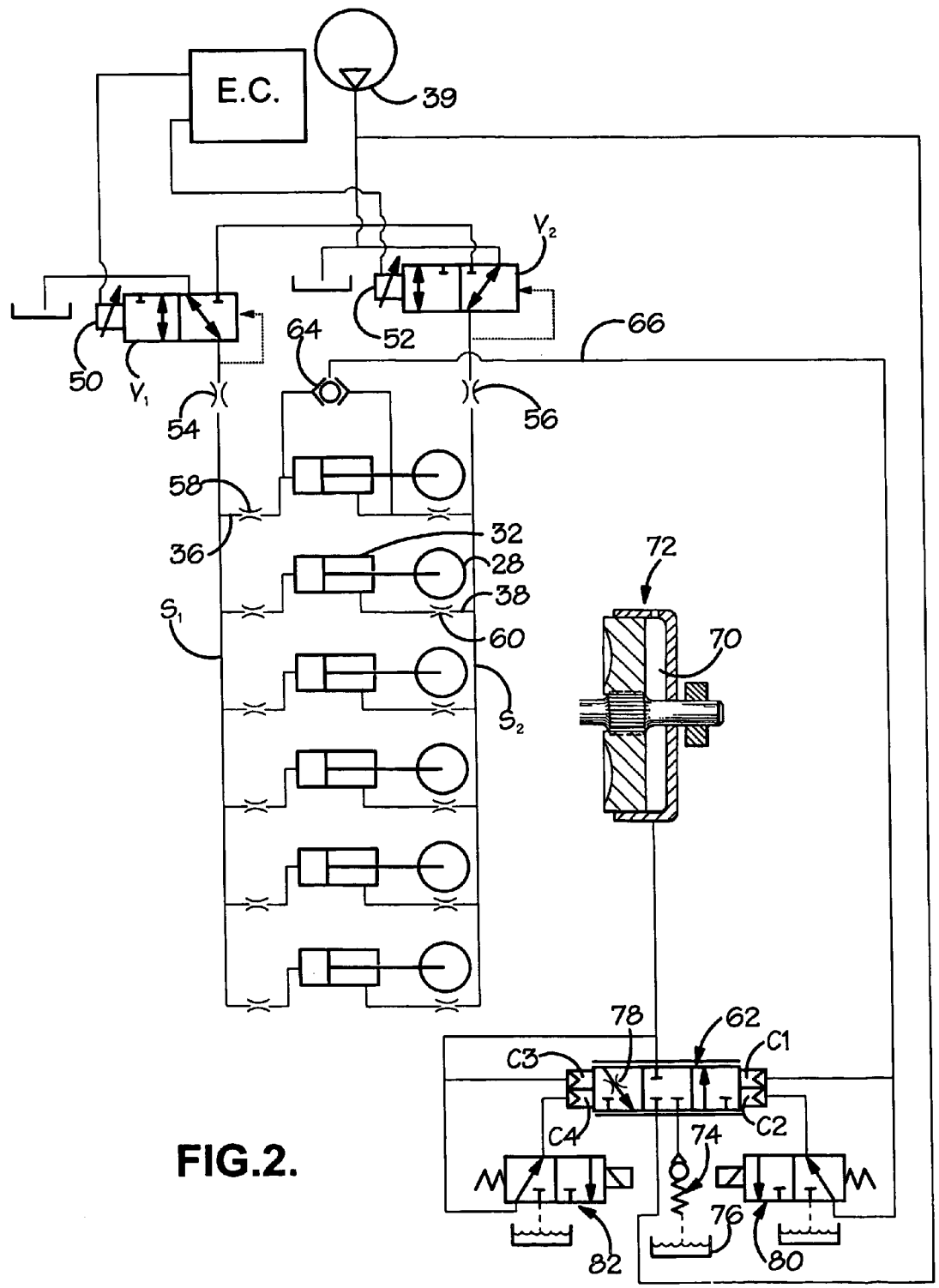
FIG. 2 is a diagramatic representation of a hydraulic arrangement for controlling the variator in accordance with the present invention, incorporating a traction control valve.

FIG. 2 shows a hydraulic circuit which serves to control both reaction force and traction load. A set of rollers 28, each with an associated roller actuator 32, is indicated schematically although other parts of the variator itself are omitted. Opposite sides of each actuator 32 are connected via the feeds lines 36, 38 to respective supply lines $S_1$, $S_2$. Pressure in the supply lines is adjustable by means of pressure reducing control valves $V_1$, $V_2$ fed with high pressure fluid by a pump 39. As indicated in the drawing, both control valves have a respective solenoid 50, 52 whose force upon the valve spool is opposed by a pilot signal from the associated supply line. Hence by setting the solenoid force, an electronic controller E.C. sets desired control pressures in the supply lines and in the roller actuators, thereby controlling desired reaction force. Note however that reaction force and the control pressures are also subject to external influences, as will now be explained.

Roller motion is accompanied by flow in the hydraulics. If there were no restrictions upon flow of fluid then such flow would not result in any pressure change since the valves $V_1$, $V_2$ would act to maintain constant pressure. However any hydraulic arrangement provides some degree of restriction upon flow and in fact the present circuit incorporates restrictions in the form of dampers 54, 56, 58, 60 each with a restricted cross section for fluid flow, the dampers serving to create back pressure when flow takes place. Their purpose is to damp oscillation of the variator rollers 28. First dampers 54, 56 disposed in the supply lines $S_1$, $S_2$ damp a mode of oscillation in which the rollers move in unison with each other. Second dampers 58, 60 in the feed lines to individual actuators 32 damp a different mode of oscillation in which the rollers move out of phase with each other. The dampers may be formed as orifices or may take other forms. The important point for present purposes is that when the rollers move and flow takes place in the circuit, the dampers create back pressure in the hydraulics tending to resist the roller motion.

Consider, therefore, what happens in the event of a transmission torque spike created for example by hard vehicle braking. The brakes apply a large torque causing the vehicle wheels and consequently the variator output disc to decelerate. Variator ratio consequently falls and the variator rollers are required to rapidly move and precess to positions corresponding to lower ratio. Fluid in the hydraulics is displaced by the rapidly moving pistons of the actuators 32 and resistance to the resulting flow in the hydraulics, created by the dampers and by other parts of the hydraulics including the valves $V_1$, $V_2$, produces an increase in fluid pressure on one side of each actuator and a reduction on the other side, tending to resist the roller movement. Reaction force is dramatically increased in a manner which is not initiated nor directly predictable by the electronic control.

The traction load must be modified in sympathy with the reaction force if excessive roller slip is to be avoided and this is achieved by means of traction control valve 62 which receives two pilot control pressures.

A higher-pressure-wins valve arrangement 64, which may be formed using back-to-back non-return valves, connects its own output 66 to whichever of the two sides of the hydraulic circuit is at higher pressure, this output being led to the traction control valve 62 to serve as a first pilot pressure which is referred to below as the "reaction pressure". Note that the higher-pressure-wins valve arrangement is connected to points in the hydraulics close to the ports of one of the actuators 32, and between the chosen actuator and its dampers 58,60, so that the pressures it receives are as close as possible to the prevailing pressures in the actuator itself. The higher of the two actuator pressures is used as an indication of the reaction force. Pressure on the opposite side of the actuator is typically low and is neglected in this embodiment.

A second pilot pressure is led to the traction control valve 62 from working chamber 70 of the traction load actuator, which is indicated in highly schematic form at 72 in FIG. 2. The first and second pilot pressures act in opposition to each other upon the spool of the valve 62.

The traction valve 62 is a 3 port, 3 position valve, One port is connected to a high pressure fluid source, formed in this embodiment by the pump 39. A second port leads to the working chamber 70 of the traction load actuator. A third port leads via a non-return valve 74 to a pressure sink, which in the present embodiment takes the form of transmission drain 76. In dependence upon the pilot pressures, the traction valve either:— i. connects the traction load actuator to the drain 76 via a restrictor 78, venting pressure therefrom, while closing the high pressure port;
ii. closes all three ports to sustain pressure in the traction load actuator; or
iii. connects the traction load actuator to the high pressure source—the pump 39—to boost pressure therein and increase traction load.

Because this control is carried out in dependence upon reaction pressure, the valve serves to vary traction load in sympathy with, and more specifically in proportion to, reaction pressure and hence reaction force. In this way the hydraulics can serve to maintain traction coefficient substantially at a chosen level. However the traction coefficient set by the valve 62 is also adjustable in accordance with the present invention, as will now be explained.

Note that the traction control valve has two working chambers within which reaction pressure can act to influence valve state, labelled C1 and C2. Similarly there are two working chambers within which traction load pressure can act to influence valve state, labelled C3 and C4. A constantly open connection leads reaction pressure to the first of the reaction pressure chambers C1. However a reaction pressure valve, formed as a two port, two position valve 80 under control by the E.C., serves to connect the second reaction pressure chamber C2 either to reaction pressure or to drain. Likewise a constantly open connection leads tractions pressure to first traction pressure chamber C3 and a traction pressure valve 82 connects second traction pressure chamber C4 either to traction pressure or drain, under control by the E.C.

Opening and closing the reaction pressure and traction pressure valves changes the areas upon which the pilot pressures act. In this way the ratio of traction pressure to reaction pressure provided by the traction control valve is adjusted—i.e. traction coefficient is adjusted. The adjustment to traction coefficient is discrete rather than continuous: in the illustrated embodiment four different values of traction coefficient μ can be provided, since there are four possible states for the combination of the two valves.

Let us refer to the working areas within the chambers C1 to C4 as A1 to A4. Typically the pilot pressures act to move the valve spool and it is on the spool that the areas A1 to A4 are formed, although it is possible to devise alternative valves in which the areas are formed instead upon other valve parts, such as a moveable sleeve. Also let us define a "design" traction coefficient to be the value $\mu_d$ of traction coefficient obtained if traction and reaction pressures are equal. $\mu_d$ is dependent e.g. upon the area of a piston in the end load actuator. The actual traction coefficient μ is found from $$\mu = \frac{A_T}{A_R} \times \mu_d$$

where $A_R$ is the total working area $(A_1+A_2)$ of the valve upon which reaction pressure is exerted and $A_T$ is the total working area $(A_3+A_4)$ upon which traction pressure is exerted. Suppose further that it is desired to provide for a range of traction coefficients from $1.5\mu_d$ for efficient operation to $$\frac{\mu_d}{2}$$

for high speed operation.

This can be achieved by forming the valve such that $$\frac{A_1 + A_2}{A_3} = 2$$

and $$\frac{A_3 + A_4}{A_1} = 1.5$$

if we take $$A_R = A_T$$

then a suitable solution is that $$A_1 = \frac{2A_T}{3}$$

$$A_2 = \frac{A_T}{3}$$

$$A_3 = \frac{A_T}{2}$$

$$A_4 = \frac{A_T}{2}$$

The four possible combinations of states of the reaction pressure and traction pressure valves 80, 82 can be represented in a truth table:—

| Reaction Pressure Valve | Traction Pressure Valve | μd |
|---|---|---|
| Open | Closed | 0.5 μd |
| Closed | Closed | 0.75 μd |
| Open | Open | 1 μd |
| Closed | Open | 1.5 μd |

Of course the above calculations serve as examples only. Different valve areas may be chosen in accord with different design criteria.

Figure 3:
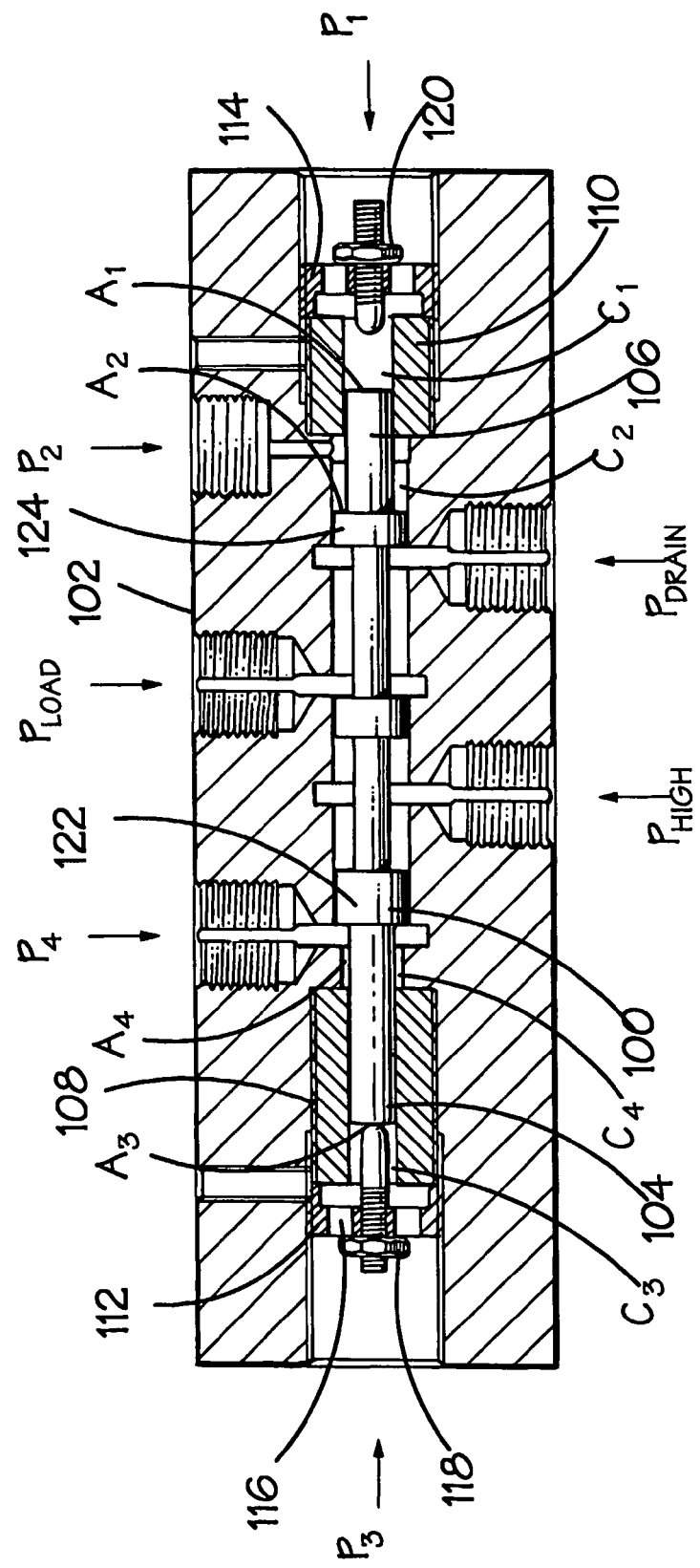
FIG. 3 is a cross section through a practical embodiment of the traction control valve.

The practical embodiment of the traction control valve 62 illustrated in FIG. 3 has a valve spool 100 slidably received in a stepped longitudinal bore of a valve body 102. The three valve ports are labelled as follows:— port $P_{LOAD}$ is connected to the traction load actuator
port $P_{HIGH}$ is connected to the high pressure source and
port $P_{DRAIN}$ is connected to the drain All three valve ports are formed as stepped, transverse bores in the valve body 102 communicating with the longitudinal bore 102. The four chambers in which pilot pressures act are once more labelled $C_1$ to $C_4$ and communicate with respective connection passages $P_1$ to $P_4$, two of which are formed as transverse bores and the other two of which are formed by end regions of the bore 102. The valve spool has narrowed end regions 104, 106 which slide, and seal, in respective bushes 108, 110 so that pilot pressures in chambers $C_1$ and $C_3$ act only upon respective end areas $A_1$, $A_3$ of the spool. The bushes are retained by respective externally threaded end plates 112, 114 both having through bores 116 to permit fluid to pass. Bolts 118, 120 passing through the respective end plates limit the spool's travel by abutting with its ends $A_1$, $A_3$. Outer piston portions of 122, 124 of the spool seal and slide in an enlarged centre portion of the longitudinal bore, their respective outer faces providing the areas $A_2$ and $A_4$. Switching between the three valve states is carried out by an inner piston portion 126 which, depending upon spool position, connects $P_{LOAD}$ to $P_{HIGH}$ or to $P_{DRAIN}$, or alternatively closes $P_{LOAD}$.

It will be appreciated by the reader that by connecting/disconnecting the controlling pressures to the working chambers C2, C4 a discontinuous adjustment to traction coefficient is effected. In the embodiments illustrated in FIGS. 2 and 3 the relevant working chambers are found in the traction control valve 62. Another way to provide for the desired traction coefficient adjustment is to connect/disconnect chambers within the traction load actuator.

Figure 4:
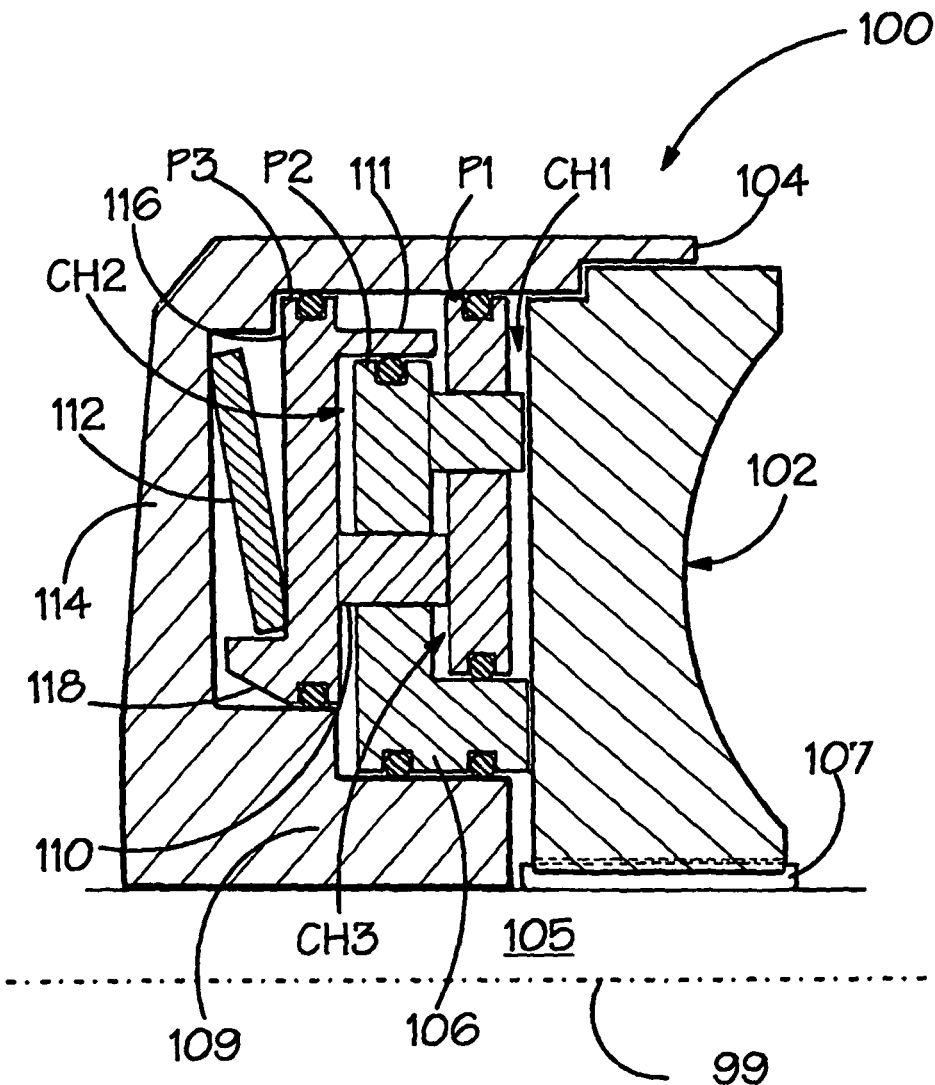
FIG. 4 is a cross section through a traction load actuator constructed in accordance with the present invention.

A suitable traction load actuator 100 is illustrated in FIG. 4. This drawing shows only half of the actuator, lying to one side of its rotational axis 99. In this drawing one of the variator discs is indicated at 102 and is received in the manner of a piston within an annular, shaped sleeve 104 which is carried upon variator shaft 106 and rotates along with it Splines 107 between the disc 102 and the shaft 105 ensure that they rotate together but that the disc is able to move along the shaft under the influence of the end load. The actuator 100 comprises first, second and third annular pistons P1, P2, P3 within the sleeve 104 which together define first, second and third working chambers CH1, CH2 and CH3. Pressurizing any of the three working chambers creates a traction load urging disc 102 toward the right hand side of the drawing. However each working chamber provides a different working area, so that the magnitude of the traction load differs depending upon which of the working chambers is pressurized. In this embodiment the traction control valve 62 (FIG. 2) may be dispensed with. The reaction pressure taken through the output line 66 of the higher-pressure-wins valve 64 is instead led, through an arrangement of switching valves (not illustrated), to a chosen working chamber CH1, CH2 or CH3, or to a combination of chambers. Because reaction pressure is being used to create the traction load, a relationship is once more maintained between reaction force and traction load: one is proportional to the other (at least while pressure changes, due e.g. to flow through higher-pressure-wins valve 64 and line 66, can be neglected so that the pressures in the actuators 32 and 100 can be taken to be identical). Furthermore, because there is the facility to change the combination of working chambers in which the reaction pressure acts, this relationship can be adjusted, varying the traction coefficient.

Looking in more detail at the construction of the traction load actuator 100, the first chamber CH1 is defined between the rear face of the variator disc 102 and front surfaces of first piston P1, sleeve 104 and an annular spigot portion 106 of piston P2. First piston P1 rides upon the spigot portion 106 and seals against that part and against a cylinder bore of sleeve 104 by virtue of sealing rings. Second piston P2 carries first stubs 108 (only one of which is seen in the drawing) which project forward through first piston P1, forming a seal with it, so that by virtue of abutment of the stubs 108 against the rear face of the variator disc 102, the second piston P2 is able to exert a force upon the disc and so contribute to the traction load. The second piston P2 rides upon a hub portion 109 of the sleeve 104 and is also received within an annular flange portion 111 of the third piston P3, forming seals with both through respective sealing rings. Third piston P3 carries second stubs 110 which project forward through second piston P2, forming a seal with it, and can abut against the rear face of first piston P1 to exert a force upon it. Third piston P3 rides upon an enlarged diameter portion of the hub portion 109 and seals against that and also against the cylinder bore of the sleeve 104 by virtue of respective sealing rings. A frustoconical spring 112 is pre-stressed between an end wall 114 of the sleeve 104 and rear face 116 of the third piston P3.

When none of the three working chambers CH1, CH2, CH3 is pressurized, a pre-loading traction force is applied to the disc 102 by the pre-stressed spring 112 acting through the piston P3, the second set of stubs 110 and the first piston P1 which bears upon the rear of the disc. This pre-load provides traction upon start-up of the transmission. Subsequently applying sufficient pressure to any of the working chambers causes the piston P3 to move leftward until a flange 118 projecting from its rear face abuts the sleeve's end wall 114, and in this condition the effect of the spring 112 is removed and traction load is determined by pressures in the working chambers.

If working chamber CH1 alone is pressurized then piston P1 moves leftward to the limit of its travel, defined by its abutment with the second set of stubs 110. Fluid pressure acts upon the entire area of the rear face of the disc 102. Pressurizing the second working chamber CH2 alone causes fluid pressure to be applied to the smaller area formed by the rear face of the second piston P2, this force being transmitted to the disc 102 through the first set of stubs 108. Pressurizing only the third working chamber CH3 causes fluid pressure to be applied to the still smaller working area formed by the rear face of the first piston P1, which consequently advances to bear upon the disc 102 and so apply a force to it. Hence by applying the same reaction pressure to any one of the three working chambers a different traction load, and a different traction coefficient, is obtained.

Still more different values of traction coefficient can be obtained by applying pressure to two or more of the working chambers. Pressurizing the first and second chambers CH1 and CH2 provides a traction force determined by the sum of the areas of the rear faces of the disc 102 and the second piston P2. A different traction force again can be provided by pressurizing all three chambers.

Supply of fluid to the working chambers CH1, CH2, CH3 can be provided for through bores in the shaft 106 (not shown in this simplified drawing).

The aforegoing embodiments serve as examples only of ways to implement the present invention. Numerous variants are possible. One such combines some of the virtues of the two embodiments shown in FIGS. 2 and 4 by using a pilot operated valve to supply pressure to the working chambers CH1, CH2, CH3 of the FIG. 4 actuator. The valve in question has a spool subject to opposed reaction and traction load pressures. It does not require the switchable chambers C2, C4 of valve 62 (FIG. 2), since instead traction coefficient adjustment is achieved by supplying its output, through any of three switching valves, to the selected working chamber(s) in the FIG. 4 traction load actuator.

What is claimed is:

1. A hydraulic control arrangement for a variator having a pair of races, at least one roller which is arranged to engage both races to transfer drive from one race to the other and is movable in accordance with changes in variator drive ratio, a hydraulic traction loading actuator arranged to apply a traction load urging the roller and races into engagement to provide traction therebetween and so enable the transfer of drive, and at least one hydraulic roller actuator arranged to apply a reaction force to the roller, the hydraulic control arrangement comprising:

hydraulics for applying fluid at an adjustable reaction pressure to the roller actuator to control the reaction force and for applying fluid to the traction loading actuator at a traction pressure which is related to the reaction pressure, thereby maintaining a relationship between reaction force and traction load; and a fluid component having at least two working chambers, at least one of which is selectively connectable to and disconnectable from one of the reaction pressure and the traction pressure, and at least one of which is supplied with the reaction pressure at any given time in operation, the traction force being dependent upon pressure in both of the working chambers, so that by connecting or disconnecting either or both of the working chambers to or from the relevant pressure, the relationship between reaction force and traction force is changed.

2. The hydraulic control arrangement as claimed in claim 1, wherein reaction pressure is constantly supplied to at least one working chamber in the hydraulics by which traction force is controlled.

3. The hydraulic arrangement as claimed in claim 1, wherein the at least two working chambers each is selectively connectable to and disconnectable from the reaction pressure or the traction pressure, so that by selecting different permutations of the chambers multiple different relationships between reaction force and traction force are obtainable.

4. The hydraulic arrangement as claimed in claim 1, wherein the fluid component comprises a traction pressure control valve.

5. The hydraulic arrangement as claimed in claim 1, further comprising a traction pressure control valve whose output forms the traction pressure and is controlled in response to opposed pilot pressure signals formed by (i) the reaction pressure and (ii) the traction pressure.

6. The hydraulic arrangement as claimed in claim 5, wherein at least one of the aforementioned working chambers is a chamber of the traction pressure control valve, pressure in the chamber serving as a pilot pressure influencing the valve's output.

7. The hydraulic arrangement as claimed in claim 5, wherein the traction pressure control valve has at least three working chambers, pressures in each of which serve as pilot signals influencing the valve's output:

a first working chamber constantly connected to reaction pressure a second working chamber constantly connection to the traction pressure, pressures in the first and second chambers working in opposition, and a third working chamber which is selectively connectable to and disconnectable from the reaction pressure or the traction pressure.

8. The hydraulic arrangement as claimed in claim 7, further comprising a fourth working chamber which is selectively connectable to and disconnectable from the reaction pressure or the traction pressure.

9. The hydraulic arrangement as claimed in claim 1, wherein the aforementioned working chambers are formed within the traction loading actuator, pressure in the working chamber contributing to the traction load.

10. The hydraulic arrangement as claimed in claim 9, wherein one of the two working chambers is constantly connected to the traction pressure and the other working chamber is selectively connectable to and disconnectable from the traction pressure.

11. The hydraulic arrangement as claimed in claim 10, comprising a further selectively connectable working chamber.

12. The hydraulic arrangement as claimed in claim 1, wherein the reaction pressure and the traction pressure are the same.

* * * * *